(12) United States Patent
Takimoto et al.

(10) Patent No.: US 6,698,893 B2
(45) Date of Patent: Mar. 2, 2004

(54) OPTICAL DEVICE SUITABLE FOR SEPARATING AND SYNTHESIZING LIGHT

(75) Inventors: Shunta Takimoto, Nishinomiya (JP); Kazuhiko Inoue, Suita (JP)

(73) Assignee: Minolta Co., Ltd., Osaka (JP)

( * ) Notice: Subject to any disclaimer, the term of this patent is extended or adjusted under 35 U.S.C. 154(b) by 74 days.

(21) Appl. No.: 10/021,463

(22) Filed: Dec. 12, 2001

(65) Prior Publication Data

US 2002/0071102 A1 Jun. 13, 2002

(30) Foreign Application Priority Data

Dec. 13, 2000 (JP) ........................................ 2000-378589

(51) Int. Cl.[7] ............................................. G03B 21/14
(52) U.S. Cl. ................ 353/31; 353/33; 349/5
(58) Field of Search ........................ 353/20, 31, 33, 353/34, 37; 349/5, 8, 9; 348/262, 265, 336, 337, 338, 339; 359/634, 638

(56) References Cited

U.S. PATENT DOCUMENTS

| | | | |
|---|---|---|---|
| 4,943,154 A | | 7/1990 | Miyatake et al. .............. 353/31 |
| 5,042,913 A | * | 8/1991 | Yamamoto .................... 359/540 |
| 5,436,661 A | * | 7/1995 | Yamamoto et al. .......... 348/264 |
| 5,622,418 A | | 4/1997 | Daijogo et al. ................. 353/97 |
| 5,644,432 A | * | 7/1997 | Doany ......................... 359/634 |
| 6,250,763 B1 | * | 6/2001 | Fielding et al. ................ 353/31 |
| 6,404,558 B1 | * | 6/2002 | Chuang et al. .............. 359/634 |
| 2002/0057499 A1 | * | 5/2002 | Sugawara et al. ........... 359/634 |
| 2002/0167646 A1 | * | 11/2002 | Ishii ............................. 353/31 |

FOREIGN PATENT DOCUMENTS

| | | |
|---|---|---|
| JP | 8-16828 B2 | 2/1996 |
| JP | 2505758 B2 | 6/1996 |

* cited by examiner

*Primary Examiner*—William Dowling
(74) *Attorney, Agent, or Firm*—Sidley Austin Brown & Wood LLP (57) ABSTRACT

An optical device is provided comprising a plurality of prisms, two dichroic surfaces having different wavelength characteristics from each other, and a prism surface that satisfies a total reflection requirement for a predetermined light component. Also provided is a projection display apparatus comprising a light source, light valves for respectively modulating components of the light from the light source, an optical device for chromatically synthesizing the modulated light components, and a projection section for projecting the modulated light. Optionally, the optical device may also be used in the projection display apparatus for separating the light from the light source into the multiple light components. Further provided is an image capturing apparatus comprising a taking lens unit for receiving light, an optical device for separating the light received by the taking lens unit into multiple light components, and imaging devices for respectively converting the multiple light components into image data.

27 Claims, 5 Drawing Sheets

OPTICAL DEVICE SUITABLE FOR SEPARATING AND SYNTHESIZING LIGHT

RELATED APPLICATION

This application is based on application No. 2000-378589 filed in Japan, the contents of which are hereby incorporated by reference.

FIELD OF THE INVENTION

This invention relates optical devices used for synthesizing multiple light components and for separating light into multiple light components. This invention also relates to projection display apparatuses and image capturing devices that include such an optical device.

DESCRIPTION OF THE PRIOR ART

In the field of optics, it is sometimes desirable to separate light into multiple light components or synthesize multiple light components to form a single ray of light. For example, image projectors are known that generate a light ray for each of a set of primary colors, such as red, green and blue, and then combine, using a color synthesizer, each of the primary color light rays into a single light ray for projection.

One type of known color synthesizer is a cross-dichroic prism that comprises four identical triangular prisms. The prisms are bonded together such that the cross-section of the bonded surfaces, which work as dichroic surfaces, have a letter X configuration. For this reason, cross-dichroic prisms are often referred to as "x-cubes".

Figure 5:
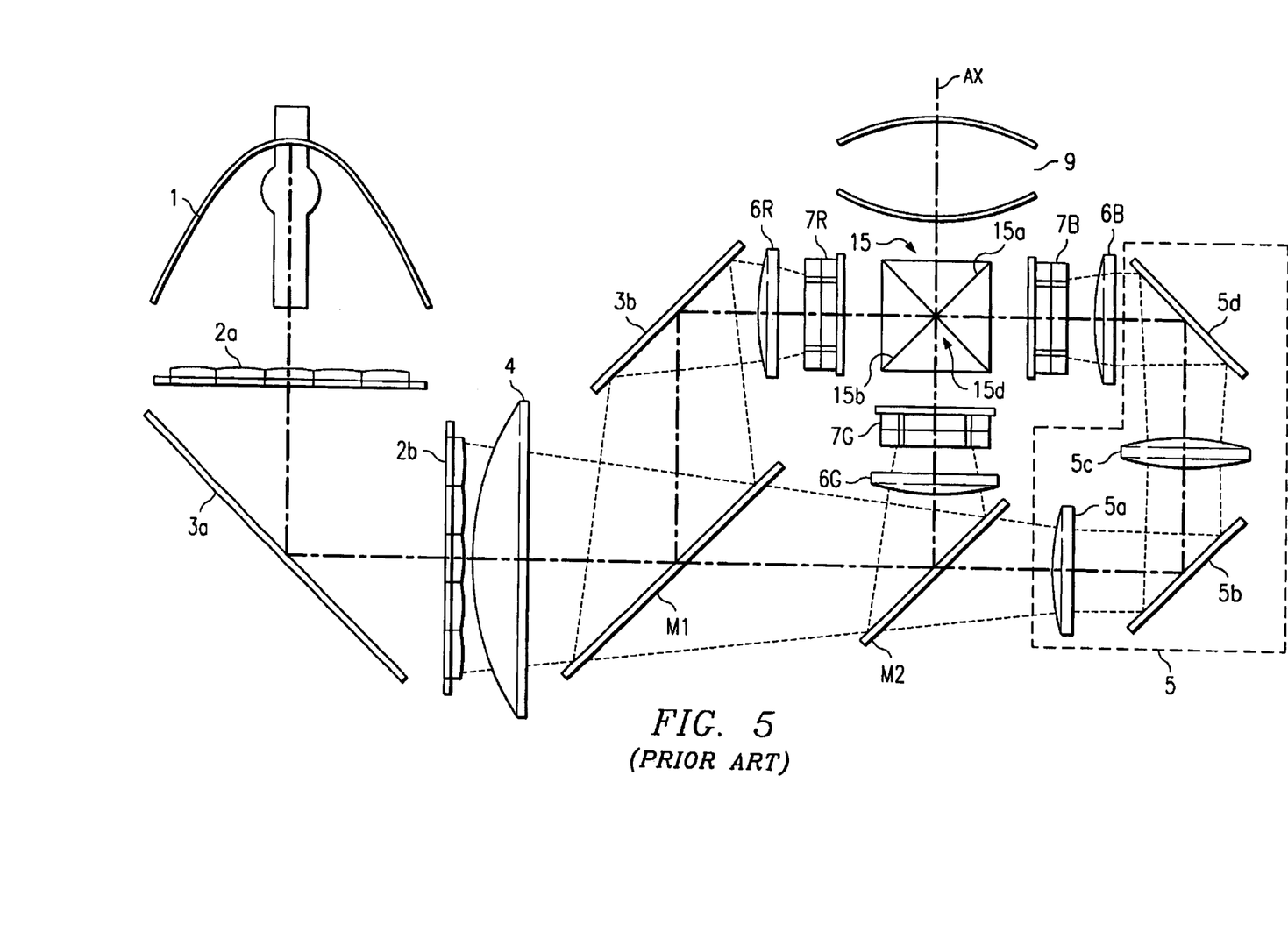
FIG. 5 is a schematic diagram of a prior art optical system and a projection display apparatus that performs color synthesis using a cross-dichroic prism.

An example of a projection display apparatus that attains color synthesis using a cross-dichroic prism is disclosed in Japanese Patent Publication No. 8-16828. An optical system for this type of projection display apparatus, as shown in FIG. 5, comprises a light source 1, lens arrays 2a and 2b, reflection mirrors 3a and 3b, a superimposing lens 4, dichroic mirrors M1 and M2, a relay optical system 5, field lenses 6R, 6G and 6B, transmission-type light valves 7R, 7G and 7B, a cross-dichroic prism 15, and a projection lens 9 (having an optical axis AX) as well as other miscellaneous components. The spatial energy distribution of the light from the light source 1 is made uniform by an integrator means comprising the two lens arrays 2a and 2b and a superimposing lens 4. Between the two lens arrays 2a and 2b, the light path of the illuminating light is bent by the reflection mirror 3a. Where the light valves 7R, 7G and 7B are composed of liquid crystal, a polarization conversion means (not shown) is located near the integrator means in order to improve the efficiency of the use of the light from the light source 1.

The first and second dichroic mirrors M1 and M2 are color separating means that separate the illuminating light exiting the integrator means into red (R), green (G) and blue (B) light components. The R light component is reflected by the first dichroic mirror Ml, and, after it is reflected by the reflection mirror 3b, it passes through the field lens 6R. The G and B light components, on the other hand, pass through the first dichroic mirror M1. The G light component is reflected by the second dichroic mirror M2 and then passes through the field lens 6G. The B light component passes through the second dichroic mirror M2 and then passes through the relay optical system 5 comprising relay lenses 5a and 5c and reflection mirrors 5b and 5d as well as the field lens 6B.

Each field lens 6R, 6G and 6B has a power determined such that the light exiting the lens strikes the pupil of the projection lens 9. The R, G and B light components that have respectively passed through the field lenses 6R, 6G and 6B are modulated by the transmission-type light valves 7R, 7G and 7B that are provided near the field lenses 6R, 6G and 6B. The modulated R, G and B light components are chromatically synthesized by the cross-dichroic prism 15, which comprises a color synthesizer, and are then projected onto a screen (not shown) by the projection lens 9.

Figure 6:
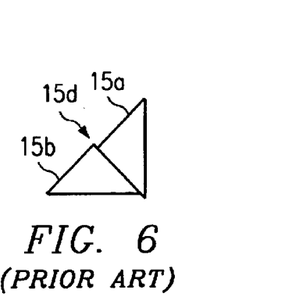
FIG. 6 is a cross-sectional view by which to illustrate the precision in bonding triangular prisms that comprise a prior art cross-dichroic prism.
Figure 7:
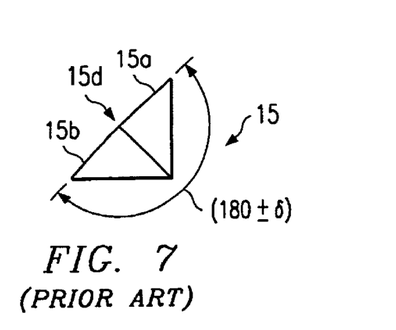
FIG. 7 is a cross-sectional view by which to illustrate the precision in processing triangular prisms that comprise a prior art cross-dichroic prism.

The cross-dichroic prism 15 that performs color synthesis of the R, G and B light components comprises four triangular prisms bonded to one another, as described above. The dichroic surfaces, the cross-sectional configuration of which forms a letter X, reflect only R and B light components and allow the G light component to pass through, resulting in color synthesis of the three colors. In the color synthesis, the R light component exiting the first light valve 7R, for example, is reflected by the first dichroic surface comprising two surfaces 15a and 15b. The fact that one dichroic surface 15a or 15b is defined by two different triangular prisms contributes to reduced precision in the manufacture of the cross-dichroic prism 15. For example, if the accuracy of bonding of the prisms is poor, one dichroic surface becomes defined by two surfaces 15a and 15b that are parallel to but offset from each other with the apex 15d of one of the prisms serving as a boundary, as shown in FIG. 6. In addition, if the precision in the processing of individual triangular prisms is poor, one dichroic surface becomes defined by two surfaces 15a and 15b that create an angle $(180\pm\sigma)°$ when measured with the apex 15d as the center, $\sigma$ representing the angular deviation from flatness created by the two surfaces, as shown in FIG. 7.

The same precision-reducing factors exist with the second dichroic surface that reflects the light exiting the third light valve 7B, as with the first dichroic surfaces 15a and 15b. When the light exiting the first and third light valves 7R and 7B is reflected by the first and second dichroic surfaces having reduced precision, respectively, partial mismatch occurs in the synthesis of the projected images from the individual light valves 7R, 7G and 7B. This mismatch cannot be adjusted by adjusting the positions of the light valves 7R, 7G and 7B relative to one another. If a cross-dichroic prism 15, including precision reducing factors caused during manufacture, is used for color synthesis as described above, limitation results in making the light valves 7R, 7G and 7B compact and delicate, in particular, due to concerns regarding precision. Furthermore, because manufacture ensuring high precision is required, the price of the product will also increase.

Figure 8:
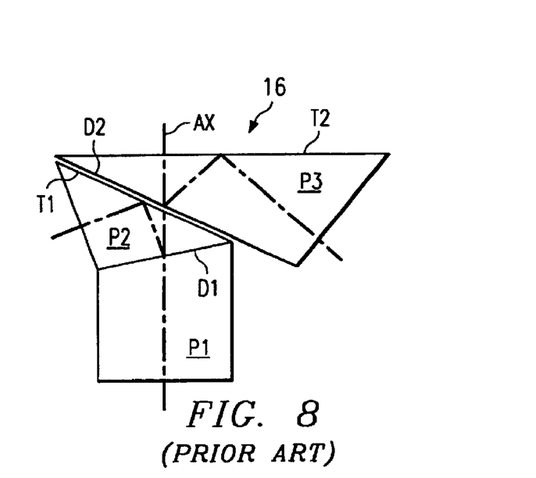
FIG. 8 is a cross-sectional view showing a prior art example of a dichroic prism that can be used for color synthesis.
Figure 9:
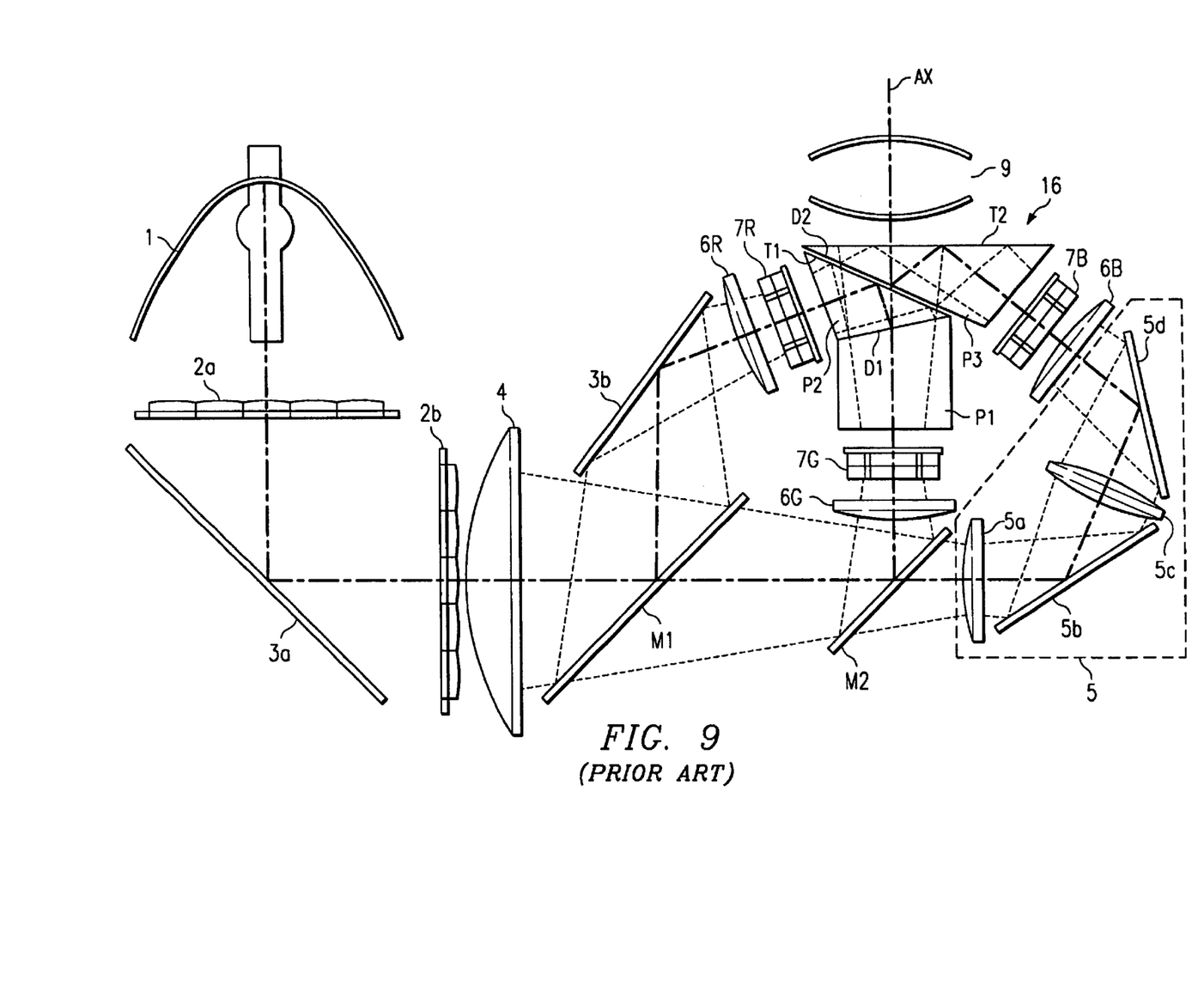
FIG. 9 is a schematic diagram of a prior art optical system and a projection display apparatus that performs color synthesis using the dichroic prism shown in FIG. 8.

Another type of known color synthesizer, as illustrated in FIG. 8 and disclosed in Japanese Patent No. 2505758, is a dichroic prism 16. Color synthesizers such as dichroic prism 16 are often refered to as "philips-type" prisms. The dichroic prism 16 has an optical axis AX and comprises three prisms P1, P2 and P3. The bonded surfaces of the first prism P1 and the second prism P2 define a first dichroic surface D1. In the third prism P3, the surface that opposes a prism surface T1 of the second prism P2 with a certain space therebetween comprises a second dichroic surface D2. The third prism P3 also has a prism surface T2, the significance of which will be discussed below. If a dichroic prism 16 (in FIG. 8) is used instead of the cross-dichroic prism 15 in the projection display apparatus described above with reference to FIG. 5, an optical construction shown in FIG. 9 results. In FIG. 9, identical or equivalent members to those in the projection display apparatus shown in FIG. 5 are indicated using the same numbers and letters.

The R light component undergoes total reflection by the prism surface T1, is reflected by the first dichroic surface D1, and is then synthesized with the G light component. The chromatically synthesized R and G light components strike the second dichroic surface D2. The B light component undergoes total reflection by the prism surface T2, followed by reflection by the second dichroic surface D2, and is synthesized with the R and G light components. The R, G and B light components synthesized by the two dichroic surfaces D1 and D2 exit through the prism surface T2, and are projected by the projection lens 9 onto a screen (not shown).

The dichroic prism 16 shown in FIG. 8 entails little reduction in precision during manufacturing because both of the first and second dichroic surfaces D1 and D2 are defined by a single prism surface. However, in comparison with the display apparatus shown in FIG. 5, if the optical construction of the display apparatus shown in FIG. 9 is such that illumination is carried out based on the same F-number while using transmission-type light valves 7R, 7G and 7B that are of the same size as those included in the apparatus shown in FIG. 5, the overall size of the illuminating system including the color separating means becomes large.

SUMMARY OF THE INVENTION

An object of the present invention is to provide an improved color synthesizing device.

Another object of the present invention is to provide an improved and inexpensive optical apparatus that is capable of performing color synthesis with a high degree of accuracy.

In order to attain these and other objects, a color synthesizer is provided that comprises first, second, and third prisms. The first prism has a first receiving surface for receiving the first light component from the first light valve, the second prism has a second receiving surface for receiving the second light component from the second light valve, and the third prism has a third receiving surface for receiving the third light component from the third light valve. The first prism also has a first exit surface for allowing the thus received first light component to pass from the first prism to the second prism, and the second prism has a first synthesizing surface for reflecting the thus received second light component while receiving the first light component from the first prism, thereby synthesizing the first and second light components. The second prism also has a second exit surface for allowing the thus synthesized first and second light components to pass from the second prism to the third prism, wherein the second light component is synthesized with the first light component before striking the second exit surface. The third prism has a second synthesizing surface for reflecting the third light component while receiving the synthesized first and second light components from the second prism, thereby synthesizing the first, second, and third light components. Finally, the third prism has a third exit surface for both reflecting the third light component and allowing the synthesized first, second, and third light components to exit from the color synthesizer.

In the color synthesizer such as one described above, an angle between an optical axis of the projecting section and each of the first synthesizing surface and the first exit surface is preferably in a range from about 40° to 50°, most preferably 45°. Also, an angle between (a) the second light component after being received by the second receiving surface but before being synthesized with the first light component, and (b) the first light component after being received by the first receiving surface, but before being synthesized with the second light component, is preferably in a range from about 80° to 100°, most preferably 90°. Finally, it is preferable that adjacent portions of the second exit surface and the second synthesizing surface are fixed to one another in such a way that they are free from air gaps.

A color synthesizing device according to another aspect of the present invention includes first, second, and third prisms, wherein the first prism includes a first receiving surface for receiving a first light ray from a first direction normal to the first receiving surface, the second prism includes a second receiving surface for receiving a second light ray from a second direction normal to the second receiving surface, and the third prism includes a third receiving surface for receiving a third light ray from a third direction normal to the third receiving surface. The first prism also includes a first exit surface for allowing the thus received first light ray to pass from the first prism to the second prism. The second prism also includes a first synthesizing surface for reflecting the thus received second light ray while receiving the first light ray from the first prism, thereby synthesizing the first and second light rays, and a second exit surface for allowing the thus synthesized first and second light rays to pass from the second prism to the third prism, wherein the second light ray is synthesized with the first light ray before striking the second exit surface. The third prism also includes a second synthesizing surface for reflecting the third light ray while receiving the synthesized first and second light rays from the second prism, thereby synthesizing the first, second, and third light rays, and a third exit surface for both reflecting the third light ray and allowing the synthesized first, second, and third light rays to exit from the color synthesizer.

In a color synthesizing device in accordance with the present invention such as the one described above, an angle between a direction normal to the third exit surface and each of the first synthesizing surface and the first exit surface is preferably in a range from about 40° to 50°, most preferably 45°. An angle between (a) the second light ray after being received by the second receiving surface but before being synthesized with the first light ray, and (b) the first light ray after being received by the first receiving surface but before being synthesized with the second light ray, is preferably in a range from about 80° to 100°, most preferably 90°. Also, it is preferable that adjacent portions of the second exit surface and the second synthesizing surface are fixed to one another in such a way that they are free from air gaps.

According to yet another aspect of the present invention, a projection display apparatus is provided that comprises a light source; a color separator for separating light from the light source into first, second, and third light components corresponding to three primary colors; first, second, and third transmission-type light valves for respectively modulating the first, second, and third light components; a color synthesizer for chromatically synthesizing the first, second, and third light components that have been respectively modulated by the transmission-type light valves; and a projecting section for projecting the thus synthesized light, wherein the color synthesizer comprises multiple prisms, first and second dichroic surfaces that have different wavelength selection characteristics from each other, and a prism surface that satisfies a total reflection requirement for the third light component, and wherein (i) the first dichroic surface is at a 40° to 50° angle relative to an optical axis of the projecting section, and is for chromatically synthesizing the first and second light components; (ii) the second dichroic surface is for chromatically synthesizing the first and second light components, which have been synthesized by the first dichroic surface, as well as the third light component that has been totally reflected by the prism surface; and (iii) the first, second, and third light components, which have been synthesized by the first and second dichroic surfaces, exit through the prism surface.

A projection display apparatus according to another embodiment of the invention comprises a light source; a light separator for separating light from the light source into first, second, and third light components corresponding to three primary colors; first, second, and third reflective light valves for respectively modulating the first, second, and third light components; a color synthesizer for chromatically synthesizing the first, second, and third light components that have been modulated by the respective reflective light valves; and a projecting section for projecting the thus synthesized light, wherein the color synthesizer comprises multiple prisms, first and second dichroic surfaces that have different wavelength selection characteristics from each other, and a prism surface that satisfies a total reflection requirement for reflecting the third light component, wherein (i) the first dichroic surface is at a 40° to 50° angle relative to an optical axis of the projecting section, and is for chromatically synthesizing the first and second light components; (ii) the second dichroic surface is for chromatically synthesizing the first and second light components, which have been synthesized by the first dichroic surface, as well as the third light component that has been totally reflected by the prism surface; and (iii) the first, second, and third light components, which have been synthesized by the first and second dichroic surfaces, exit through the prism surface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
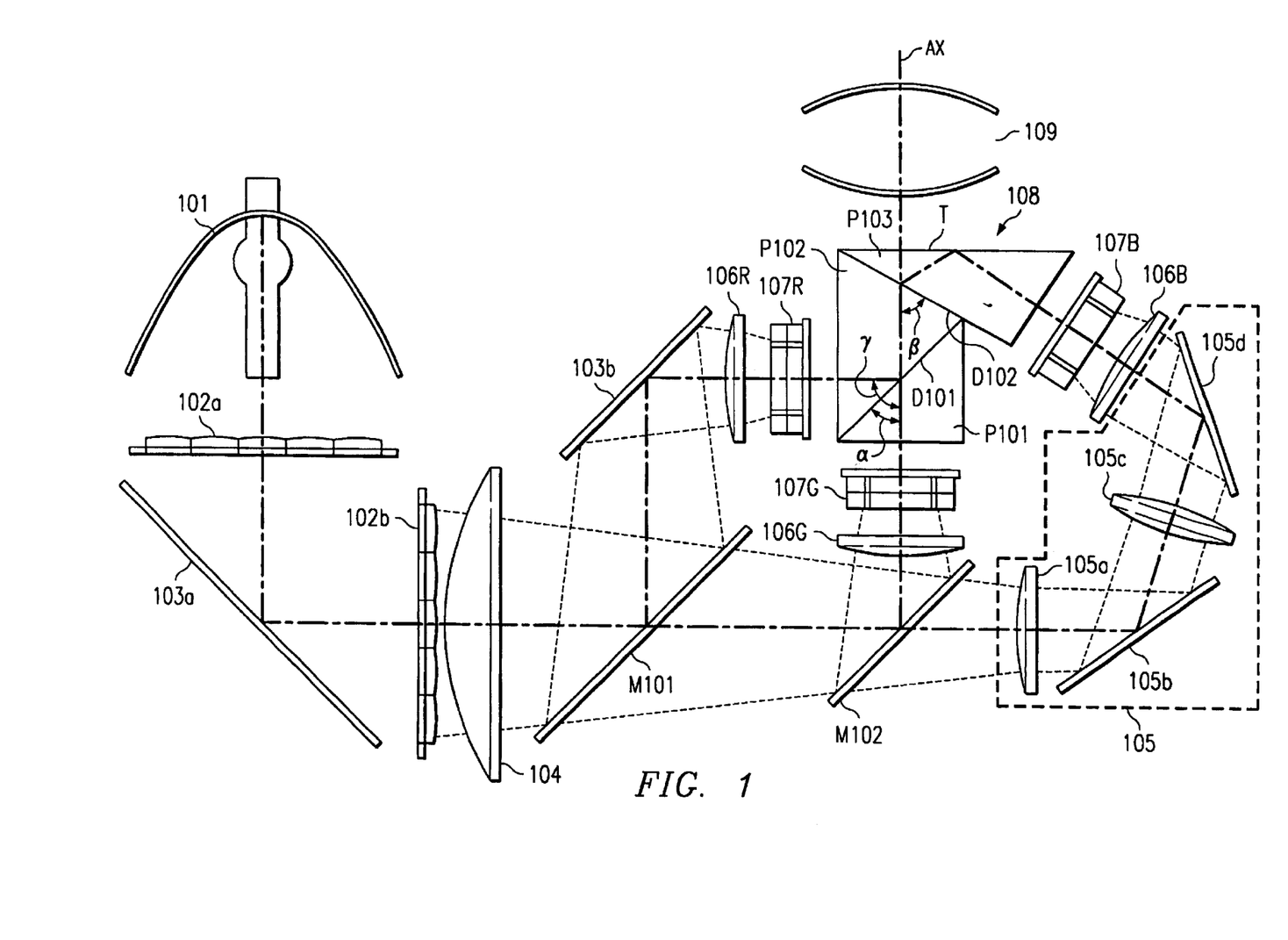
FIG. 1 is a schematic diagram of an optical system for a projection display apparatus in accordance with the present invention having transmission-type light valves.

FIG. 1 shows an embodiment of a projection display apparatus in accordance with the present invention having transmission-type light valves 107R, 107G and 107B. This projection display apparatus also comprises a light source 101, lens arrays 102a and 102b, reflection mirrors 103a and 103b, a superimposing lens 104, dichroic mirrors M101 and M102, a relay optical system 105, field lenses 106R, 106G and 106B, a dichroic prism 108, and a projection lens 109. An illuminating system for illuminating each light valve 7R, 7G and 7B comprises the lens arrays 102a and 102b, the reflection mirrors 103a and 103b, the superimposing lens 104, the dichroic mirrors M101 and M102, the relay optical system 105 and the field lenses 106R, 106G and 106B.

The spatial energy distribution of the light emitted from the light source 101 is made uniform by an integrator comprising the two lens arrays 102a and 102b and the superimposing lens 104. Between the two lens arrays 102a and 102b, the light path of the illuminating light is bent by the reflection mirror 103a. In a case where the first, second, and third transmission-type light valves 107R, 107G and 107B are composed of liquid crystal, a polarization conversion means (not shown) is provided in a location near the integrator in order to improve the efficiency of the use of the light from the light source 101.

The first and second dichroic mirrors M101 and M102 constitute a portion of a color separator for chromatically separating the illuminating light exiting the integrator into first, second, and third light components, for example, red (R), green (G) and blue (B) light components, which correspond to three primary colors. The first dichroic mirror M101 separates the R light component from the G and B light components, and the second dichroic mirror M102 separates the G light component from the B light component. Of the light that has exited the superimposing lens 104, the R light component is reflected by the first dichroic mirror M101 and, after it is reflected by the reflection mirror 103b, it passes through the field lens 106R. The G and B light components, on the other hand, pass through the first dichroic mirror M101. The G light component that has passed through the first dichroic mirror M101 is reflected by the second dichroic mirror M102 and then passes through the field lens 106G. The B light component that has passed through the first dichroic mirror M101 passes through the second dichroic mirror M102, and then passes through the relay optical system 105 comprising relay lenses 105a and 105c and reflection mirrors 105b and 105d, and through the field lens 106B.

Each field lens 106R, 106G and 106B has a power determined such that the light exiting the lens will strike the pupil of the projection lens 109. The R, G and B light components that have passed through the field lenses 106R, 106G and 106B, respectively, are modulated by the transmission-type light valves 107R, 107G and 107B that are provided near the field lenses. When this occurs, the R and G light components strike the transmission-type light valves 107R and 107G via light paths having the same or substantially the same length. The B light component strikes the transmission-type light valve 107B via a light path that can be of a length different from that of the R or G light component. Even though this difference in light path lengths exists as described above, because the B light component is relayed by the relay optical system 105 that is arranged within the light path of the B light component, it is preferable that the three light valves 107R, 107G and 107B are optically equivalently positioned relative to one another. In addition, while it is optimal if the R and G light components strike the respective transmission-type light valves 107R and 107G via light paths that are of the same length, it is not imperative that the lengths of the light paths for these light components be exactly the same. That is, the R and G light components may strike the transmission-type light valves 107R and 107G, respectively, via light paths that have approximately the same length.

Where transmission-type liquid crystal panels are used as the light valves 107R, 107G and 107B, the direction of polarization of each light component is adjusted using a polarizing plate (not shown) located on the side of each liquid crystal panel on which light is incident. Each liquid crystal panel modulates a respective light component, which has been uniformly adjusted in terms of direction of polarization, using selective polarization control in accordance with the display status of each pixel (i.e., the ON/OFF status of each pixel) for a two-dimensional image, and allows light that comprises two types of polarized light, i.e., P-polarized light and S-polarized light, to exit. Of the light that has passed through a respective one of the light valves 107R, 107G and 107B, only a certain type of polarized light passes through the polarizing plate (not shown) located on an exit side of the liquid crystal panel and strikes the dichroic prism 108. The R, G and B light components respectively modulated by the transmission-type light valves 107R, 107G and 107B in this way undergo color synthesis by the dichroic prism 108, which comprises a color synthesizer, and is projected onto a screen (not shown) by a projecting section which comprises the projection lens 109. The order or arrangement of R, G and B in the color separation and color synthesis is not limited to the implementation adopted in this projection display apparatus. The order or arrangement of R, G and B in the color separation and color synthesis can be changed, for example, by changing the characteristics of the dichroic mirrors M101 and M102 and the dichroic surfaces D101 and D102, which are described below. This is also true with regard to the projection display apparatus described below with reference to FIG. 3.

Figures 2, 3:
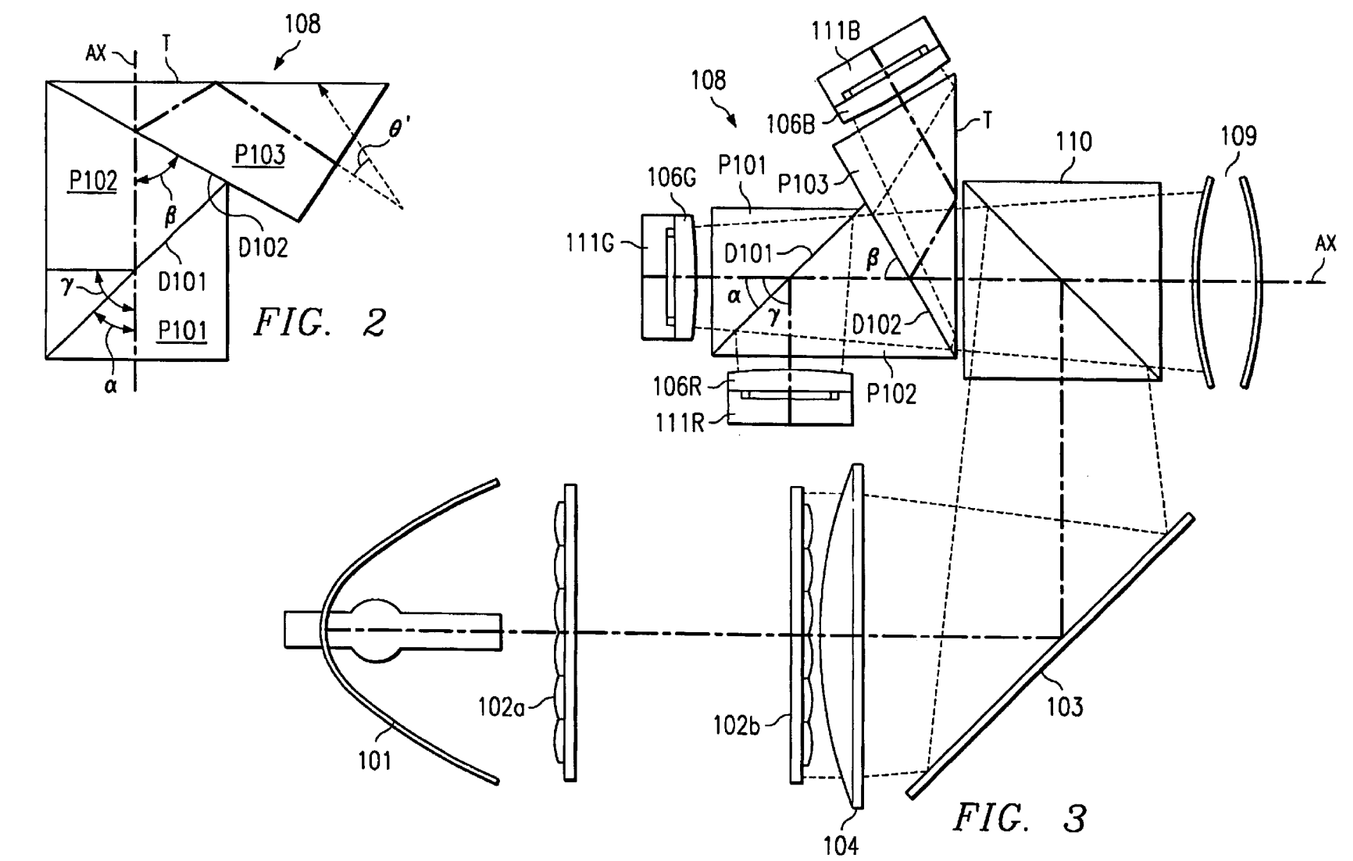
FIG. 2 is a cross-sectional view showing a dichroic prism for performing color synthesis in a projection display apparatus such as the projection display apparatus shown in FIG. 1.
FIG. 3 is a schematic diagram of an optical system for a projection display apparatus in accordance with the present invention having reflective light valves.

As shown in FIGS. 1 and 2, the dichroic prism 108 for chromatically synthesizing the R, G and B light components is composed of three triangular prisms P101, P102 and P103 that are bonded together, and has first and second dichroic surfaces D101 and D102, which have mutually different wavelength selection characteristics, as well as a prism surface T that satisfies a total reflection requirement for the B light component. The first dichroic surface D101 is at approximately a 45° angle α relative to an optical axis AX of the projection lens 109 and synthesizes the R and G light components. The R and G light components that have been synthesized by the first dichroic surface D101 strike the second dichroic surface D102. The second dichroic surface D102 synthesizes the R and G light components, which have been synthesized by the first dichroic surface D101, and the B light component, which has been totally reflected by the prism surface T. The R, G and B light components that have been synthesized by the first and second dichroic surfaces D101 and D102 exit via the prism surface T.

It is preferable for the angle α between the first dichroic surface D101 and the optical axis AX of the projection lens 109 to be in a range from about 40° to 50°, most preferably 45°, in the dichroic prism 108 of this embodiment. If the angle α is smaller than 40°, the reflection mirror 103b interferes with the light ray that exits the superimposing lens 104, and if an attempt is made to avoid this interference, the light path of the illuminating system increases in size. If the angle α is larger than 50°, the field lens 106R interferes with the light ray that is reflected by the first dichroic mirror M101 and reaches the reflection mirror 103b. If an attempt is made to avoid this interference, the light path of the illuminating system increases in size. Because the light path of the illuminating system, including the color separator, increases in size in either case, the overall size of the projection display apparatus increases. If the angle cc is in the range from about 40° to 50°, the light path of the illuminating system may be appropriately bent, leading to a smaller light path arrangement, which also enables the overall size of the projection display apparatus to be reduced.

In addition to the angle α being in the range from about 40° to 50° as described above, it is also preferable for an angle γ, which is an angle between the R light component and the G light component prior to striking the first dichroic surface D101, to be in a range from about 80° to 100°, most preferably 90°, in the dichroic prism 108 of this embodiment. Moreover, it is preferable for the reflective surface of the first dichroic mirror M101 to be parallel or substantially parallel to the first dichroic surface D101, and it is further preferable for the illuminating system to be constructed such that the reflective surface of the first dichroic mirror M101 is positioned in the same plane or substantially the same plane as the first dichroic surface D101, as shown in FIG. 1. If the first dichroic mirror M101 and the first dichroic surface D101 are positioned such that their reflective surfaces are parallel or substantially parallel to each other, an optimal compactness can be achieved for the arrangement of the light path of the illuminating system including the color separator.

Total reflection in the dichroic prism 108 preferably takes place only at the prism surface T of the third triangular prism P103. This prism surface T is the surface through which the R, G and B light components exit the dichroic prism 108 after having undergone color synthesis. The prism surface T preferably meets the total reflection requirement for the B light component, the requirement being expressed by the following formula (i) (see FIG. 2):

$$180°-2\beta-\theta'>\theta \qquad (i)$$

where:

$\beta$=the angle between the second dichroic surface D102 and the optical axis AX of the projection lens 109;

$\theta'$=the maximum light ray angle within the third triangular prism P103;

$\theta$=the critical angle $\{\theta=\arcsin(1/n)\}$; and $n$=the refractive index of the third triangular prism P103 with regard to the B light component.

As described above, because the dichroic prism 108 has a prism surface T that meets the total reflection requirement for the B light component, and a first dichroic surface D101 that is angled (α) by 40° to 50° relative to the optical axis AX of the projection lens 109, as well as a second dichroic surface D102 that carries out color synthesis of the R and G light components that have been synthesized by the dichroic surface D101 and the B light component that has once been totally reflected by the prism surface T, the arrangement of the entire illuminating system including the dichroic mirrors M101 and M102 becomes optimally compact. Consequently, the projection display apparatus can be made compact in size at a relatively low cost. In addition, because the first and second dichroic surfaces D101 and D102 each comprise a single prism surface, the standards for precision in bonding (see FIG. 6) and in processing (see FIG. 7) that are necessary during manufacturing can be lowered, which in turn helps to reduce the price of the display apparatus. Furthermore, because color synthesis can be achieved with a high degree of accuracy, the light valves 107R, 107G and 107B can be made smaller in size and more precise.

Using the dichroic prism 16 shown in FIGS. 8 and 9, because the R light component is totally reflected by the prism surface T1, a thin air layer is required between the prism surface T1 and the second dichroic surface D2. Advanced techniques must be applied in the bonding process during manufacturing in order to ensure an air gap between the prism surface T1 and the second dichroic surface D2 with high precision. In contrast, the dichroic prism 108 used in this embodiment is a bonded prism comprising three triangular prisms P101, P102 and P103, which are bonded together using an adhesive agent placed between the prism surfaces. Therefore, it is easy and inexpensive to manufacture the dichroic prisms 108.

FIG. 3 shows an embodiment of a projection display apparatus having reflective light valves 111R, 111G and 111B. In this projection display apparatus, the dichroic prism 108 described with reference to FIG. 2 is used as an optical manifold in conjunction with reflective light valves 111R, 111G and 111B for the color separation of the illuminating light and for the color synthesis of the reflected light. The projection display apparatus also comprises a light source 101, lens arrays 102a and 102b, a reflection mirror 103, a superimposing lens 104, a polarized beam splitter 110, a dichroic prism 108, field lenses 106R, 106G and 106B, and a projection lens 109. The illuminating system that illuminates each light valve 111R, 111G and 111B comprises the lens arrays 102a and 102b, the reflection mirrors 103a and 103b, the superimposing lens 104, the polarized beam splitter 110, the dichroic prism 108, and the field lenses 106R, 106G and 106B.

The spatial energy distribution of the light emitted from the light source 101 is made uniform by an integrator comprising the two lens arrays 102a and 102b and the superimposing lens 104. After the light path of the illuminating light is bent by the reflection mirror 103, the illuminating light strikes the polarized beam splitter 110. The polarized beam splitter 110 is a polarized light separator for separating the incident light into reflected light, i.e., S-polarized light, and pass-through light, i.e., P-polarized light, and in this example, it causes the reflected light or S-polarized light to strike the dichroic prism 108. The dichroic prism 108 here operates as a color separator for separating the incident light into R, G and B light components that correspond to three primary colors.

The B light component is reflected by the second dichroic surface D102, and after being totally reflected by the prism surface T, it passes through the field lens 106B. The G and R light components, on the other hand, pass through the second dichroic surface D102. The G light component that has passed through the second dichroic surface D102 passes through the first dichroic surface D101, and then passes through the field lens 106G. The R light component that has passed through the second dichroic surface D102 is reflected by the first dichroic surface D101, and then passes through the field lens 106R.

The R, G and B light components that have passed through the field lenses 106R, 106G and 106B, respectively, are modulated by the reflective light valves 111R, 111G and 111B located near each field lens. Where reflective liquid crystal panels are used for the light valves 111R, 111G and 111B, each light valve modulates the light component, i.e., S-polarized light, which has been uniformly adjusted in terms of direction of polarization via the reflection by the polarized beam splitter 110, using selective polarization control in accordance with the display status of each pixel (i.e., the ON/OFF status of each pixel) for the two-dimensional image, and causes reflected light that comprises two types of polarized light, i.e., P-polarized light and S-polarized light, to exit the respective light valve 111R, 111G or 111B. Each light component that has respectively exited one of the light valves 111R, 111G and 111B passes through a respective field lens 106R, 106G and 106B, and strikes the dichroic prism 108. The dichroic prism 108 functions as a color synthesizer for performing color synthesis of the R, G and B incident light components.

The first dichroic surface D101 chromatically synthesizes the R light component and the G light component. The R and G light components synthesized by the first dichroic surface D101 strike the second dichroic surface D102. The second dichroic surface D102 chromatically synthesizes the R and G light components synthesized by the first dichroic surface D101 and the B light component that has been reflected once by the prism surface T. It is preferable that the prism surface T totally reflects the B light component. The R, G and B light components synthesized by the first and second dichroic surfaces D101 and D102 exit the dichroic prism 108 via the prism surface T. The R, G and B light components undergo color separation and color synthesis when they move back and forth in the same light path inside the dichroic prism 108 in this way, and strike the polarized beam splitter 110 again. The polarized beam splitter 110 allows, of the incident light, only the P-polarized light to pass through as the light for projection. The light that has passed through the polarized beam splitter 110 is projected onto a screen (not shown) by a projecting section which comprises the projection lens 109.

When a dichroic prism 108 is used in a projection display apparatus having reflective light valves 111R, 111G and 111B, as in the case of this embodiment, the illuminating system as a whole becomes compactly and optimally arranged, and the same effects as the projection display apparatus shown in FIG. 1 can be obtained. Moreover, because the construction is such that the dichroic prism 108 is used for both color separation and color synthesis, the projection display apparatus can be made further compact and lower in price.

According to this embodiment, as described above, the construction is such that color synthesis is achieved using a characteristic color synthesizer, and therefore an inexpensive, compact projection display apparatus capable of performing color synthesis with a high degree of accuracy can be provided.

Figure 4:
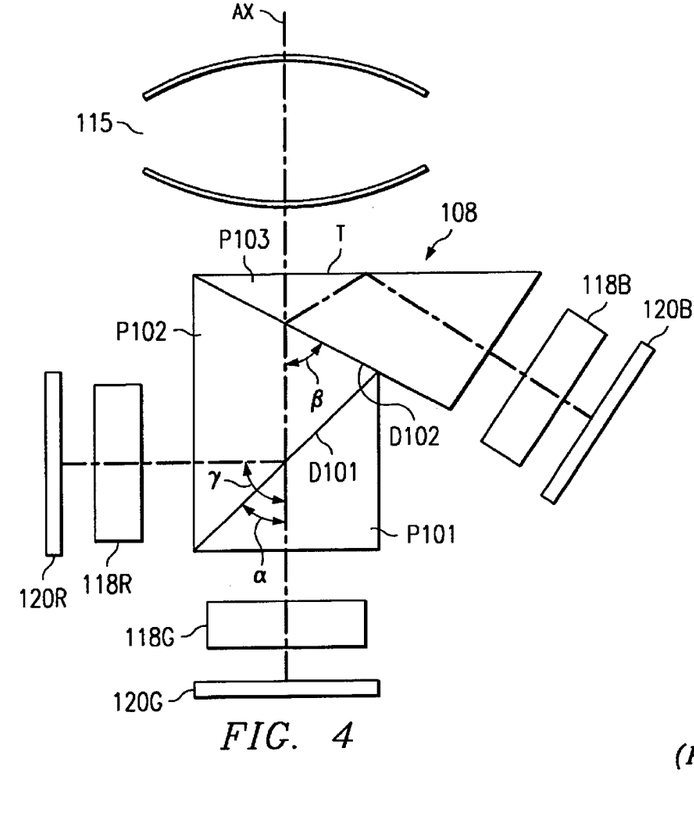
FIG. 4 is a schematic diagram of an optical system for an image capturing device in accordance with the present invention.

FIG. 4 shows another embodiment of an optical system in accordance with the present invention. This embodiment is particularly well suited for use in an image capturing device. For example, this embodiment may be incorporated into a still camera, a movie camera, and/or a PDA camera.

As shown in FIG. 4, an optical system in accordance with the present embodiment of the invention includes a taking lens unit 115 for receiving light to be imaged, and passing the light to the dichroic prism 108 along an optical axis AX. The taking lens unit 115 may include a shutter (not shown) for selectively passing light therethrough. The optical system also includes optical filters 118R, 118G and 118B, which are preferably low-pass filters, for performing spatial filtering on the R, G and B light components, respectively, after they exit the dichroic prism 108. Finally, the optical system includes imaging devices 120R, 120G and 120B for converting the filtered R, G and B light components, respectively, into image data. For example, charge-coupled devices (CCD's), photo diode arrays (PDA's), and/or complementary metal oxide semiconductor (CMOS) image devices can be used as the imaging devices 120R, 120G and 120B.

In this particular embodiment, the dichroic prism 108 is for decomposing light received through the taking lens unit 115 into R, G and B light components. As the light passes through the prism P103, the B light component is reflected by the second dichroic surface D102, is then totally reflected by the prism surface T, and then passes through the optical filter 118B to the imaging device 120B. The G and R light components, on the other hand, pass through the second dichroic surface D102. The G light component that has passed through the second dichroic surface D102 passes through the first dichroic surface D101, and then passes through the optical filter 118G to the imaging device 120G. The R light component that has passed through the second dichroic surface D102 is reflected by the first dichroic surface D101, and then passes through the optical filter 118R to the imaging device 120R.

When the dichroic prism 108 is used in an image capturing device, it is possible to use monochrome imaging devices 120R, 120G and 120B instead of multichromatic imaging devices used in conventional image capturing devices. This is advantageous from the standpoint of providing increased overall sensitivity of the image capturing device over that of a conventional image capturing device. In a conventional image capturing device, the imaging device must be capable of separately measuring R, G and B photons in the light received through a taking lens in order to generate R, G and B image data. This may be accomplished by, for example, providing a color filter array (CFA), which involves covering each pixel with either an R, G, or B filter according to a specific pattern, such as the well-known Bayer CFA pattern. Since each pixel must be made sensitive to one of the three colors R, G and B, the overall sensitivity of the imaging device is lower than that of a monochrome imaging device. In the present embodiment of the invention, the more sensitive monochrome imaging devices can be used since the color of the light is already known to be R, G, or B. Therefore, higher image quality can be achieved.

Although the present invention has been fully described by way of example with reference to the accompanying drawings, it is to be understood that various changes and modifications will be apparent to those skilled in the art. For example, many of the embodiments have been described as being useful for separating or combining R, G and B colors of light. However, one skilled in the art would appreciate that the colors of light that are combined or separated by the dichroic prism of the present invention can be varied without departing from the spirit and scope of the present invention by changing the characteristics of one or more of the dichroic surfaces included in the dichroic prism. Therefore, unless otherwise such changes and modification depart from the scope of the present invention, they should be construed as being included therein.

What is claimed is:

1. A projection display apparatus comprising:

a light source for emitting light;

a color separator for separating the light emitted from the light source into first, second, and third light components corresponding to three primary colors;

first, second, and third light valves for modulating the first, second, and third light components, respectively;

a color synthesizer for chromatically synthesizing the first, second, and third light components, which have been respectively modulated by the light valves, to form synthesized light; and a projecting section for projecting the synthesized light, wherein the color synthesizer comprises multiple prisms, wherein said multiple prisms have first and second dichroic surfaces having different wavelength selection characteristics from each other, and wherein said multiple prisms have a prism surface that satisfies a total reflection requirement for the third light component, and wherein (i) the first dichroic surface is at a 40° to 50° angle relative to an optical axis of the projecting section, and is for synthesizing the first and second light components, (ii) the second dichroic surface is for synthesizing the first and second light components, which have been synthesized by the first dichroic surface, and the third light component after being reflected by said prism surface, and (iii) the first, second, and third light components thus synthesized by the first and second dichroic surfaces exit the color synthesizer via said prism surface.

2. A projection display apparatus in accordance with claim 1, wherein each of the first, second, and third light valves is a transmission type of light valve.

3. A projection display apparatus in accordance with claim 1, wherein the first dichroic surface is approximately at a 45° angle relative to the optical axis of the projecting section.

4. A projection display apparatus in accordance with claim 1, further comprising a relay optical system located in the light path of the third light component.

5. A projection display apparatus in accordance with claim 1, wherein the first and second light components respectively strike the first and second transmission-type light valves via light paths that are the same length or substantially the same length, the third light component strikes the third transmission-type light valve via a light path that is a different length from the light path of the first or second light components.

6. A projection display apparatus in accordance with claim 1, wherein the color separator comprises first and second dichroic mirrors, wherein the first dichroic mirror separates the first light component from the second, and third light components, and the second dichroic mirror then separates the second light component from the third light component.

7. A projection display apparatus in accordance with claim 6, wherein a reflective surface of the first dichroic mirror is parallel or substantially parallel to the first dichroic surface.

8. A projection display apparatus comprising:

a light source for emitting light;

first, second, and third light valves for respectively modulating first, second, and third light components of the light emitted by the light source to form first, second, and third modulated light components;

a light manifold for separating the light emitted from the light source into said first, second, and third light components, and for synthesizing said first, second, and third modulated light components to form synthesized modulated light; and a projecting section for projecting said synthesized modulated light, wherein the light manifold comprises multiple prisms, wherein said multiple prisms have first and second dichroic surfaces having different wavelength selection characteristics from each other, and wherein said multiple prisms have a prism surface that satisfies a total reflection requirement for the third light component, and wherein (i) the first dichroic surface is at a 40° to 50° angle relative to an optical axis of the projecting section, and is for synthesizing the first and second light components, (ii) the second dichroic surface is for synthesizing the first and second light components, which have been synthesized by the first dichroic surface, and the third light component after being reflected by said prism surface, and (iii) the first, second, and third light components thus synthesized by the first and second dichroic surfaces exit the light manifold via said prism surface.

9. A projection display apparatus in accordance with claim 8, wherein each of the first, second, and third light valves is a reflective type of light valve.

10. A projection display apparatus in accordance with claim 8, wherein the first dichroic surface is approximately at a 45° angle relative to the optical axis of the projecting section.

11. A projection display apparatus in accordance with claim 8, further comprising a polarized beam splitter located in the light path between the light manifold and the projecting section.

12. A projection display apparatus in accordance with claim 11, wherein the polarized beam splitter is also located in the light path between the light source and the light manifold.

13. A projection display apparatus in accordance with claim 8, wherein the first and second light components respectively strike the first and second reflective light valves via light paths that are the same length or substantially the same length, the third light component strikes the third reflective light valve via a light path that is a different length from the light path of the first or second light components.

14. An image capturing apparatus comprising:
a taking lens unit for receiving light to be imaged;
a color separator for separating light from the taking lens unit into first, second, and third light components; and
first, second, and third imaging devices for converting the first, second, and third light components, respectively, into image data,
wherein the color separator comprises multiple prisms, wherein said multiple prisms have first and second dichroic surfaces having different wavelength selection characteristics from each other, and a prism surface that satisfies a total reflection requirement for the third light component, and
wherein (i) said light to be imaged enters the color synthesizer via said prism surface, (ii) the second dichroic surface is for separating said first and second light components from said third light component, (iii) the first dichroic surface is at a 40° to 50° angle relative to the optical axis of the taking lens unit, and is for separating the first and second light components from each other.

15. An image capturing apparatus in accordance with claim 14, wherein the first dichroic surface is approximately at a 45° angle relative to the optical axis of the taking lens unit.

16. An image capturing apparatus in accordance with claim 14, further comprising first, second, and third optical filters respectively located in the light paths between the color separator and the first, second, and third imaging devices.

17. An image capturing apparatus in accordance with claim 16, wherein said first, second, and third optical filters are low-pass optical filters suitable for spatial filtering.

18. An image capturing apparatus in accordance with claim 14, wherein at least one of said first, second, and third imaging devices is selected from a group consisting of charge-coupled devices, photo diode arrays, and complementary metal oxide semiconductors.

19. An image capturing apparatus in accordance with claim 14, wherein the first and second light components respectively strike the first and second imaging devices via light paths that are the same length or substantially the same length, and the third light component strikes the third imaging device via a light path that is a different length from the light path of the first or second light components.

20. A color synthesizing device comprising:
first, second, and third prisms,
wherein the first prism includes a first receiving surface for receiving a first light ray from a first direction normal to the first receiving surface, the second prism includes a second receiving surface for receiving a second light ray from a second direction normal to the second receiving surface, and the third prism includes a third receiving surface for receiving a third light ray from a third direction normal to the third receiving surface,
wherein the first prism includes a first exit surface for allowing the thus received first light ray to pass from the first prism to the second prism,
wherein the second prism includes a first synthesizing surface for reflecting the thus received second light ray while receiving the first light ray from the first prism, so as to synthesize the first and second light rays,
wherein the second prism includes a second exit surface for allowing the thus synthesized first and second light rays to pass from the second prism to the third prism,
wherein the second light ray is synthesized with the first light ray before striking the second exit surface,
wherein the third prism includes a second synthesizing surface for reflecting the third light ray while receiving the synthesized first and second light rays from the second prism, so as to synthesize the first, second, and third light rays, and a third exit surface for both reflecting the third light ray and allowing the synthesized first, second, and third light rays to exit from the color synthesizer, and
wherein an angle between a direction normal to the third exit surface and each of the first synthesizing surface and the first exit surface is in a range from about 40° to 50°.

21. A color synthesizing device in accordance with claim 20, wherein the angle between the direction normal to the third exit surface and each of the first synthesizing surface and the first exit surface is 45°.

22. A color synthesizing device in accordance with claim 20, wherein adjacent portions of the second exit surface and the second synthesizing surface are fixed to one another in such a way that they are free from air gaps.

23. A color synthesizing device comprising:
first, second, and third prisms,
wherein the first prism includes a first receiving surface for receiving a first light ray from a first direction normal to the first receiving surface, the second prism includes a second receiving surface for receiving a second light ray from a second direction normal to the second receiving surface, and the third prism includes a third receiving surface for receiving a third light ray from a third direction normal to the third receiving surface,
wherein the first prism includes a first exit surface for allowing the thus received first light ray to pass from the first prism to the second prism,
wherein the second prism includes a first synthesizing surface for reflecting the thus received second light ray while receiving the first light ray from the first prism, so as to synthesize the first and second light rays,
wherein the second prism includes a second exit surface for allowing the thus synthesized first and second light rays to pass from the second prism to the third prism,
wherein the second light ray is synthesized with the first light ray before striking the second exit surface,
wherein the third prism includes a second synthesizing surface for reflecting the third light ray while receiving the synthesized first and second light rays from the second prism, so as to synthesize the first, second, and third light rays, and a third exit surface for both reflecting the third light ray and allowing the synthesized first, second, and third light rays to exit from the color synthesizer, and
wherein an angle between (a) the second light ray after being received by the second receiving surface but before being synthesized with the first light ray, and (b) the first light ray after being received by the first receiving surface but before being synthesized with the second light ray, is in a range from about 80° to 100°.

24. A color synthesizing device in accordance with claim 23, wherein the angle between (a) the second light ray after being received by the second receiving surface but before being synthesized with the first light ray, and (b) the first light ray after being received by the first receiving surface but before being synthesized with the second light ray is 90°.

25. A color synthesizing device in accordance with claim 23, wherein adjacent portions of the second exit surface and the second synthesizing surface are fixed to one another in such a way that they are free from air gaps.

26. A projection display for projecting a color image in which first, second and third different color component images from first, second and third different reflective light valves are projected onto a display, in which light from a light source containing first, second and third color components passes through an optical beam splitter for directing the beam of light in first, second and third different directions onto first, second and third reflective light valves which reflect the color components back into said optical beam splitter, which combines the reflected color components into one beam for projection of a color image onto the display, wherein said optical beam splitter comprises first, second and third prisms forming a color splitting prism assembly in which the first, second and third prisms are assembled with no air gaps in each of the light paths corresponding to each of the color components between where each of the color components enters said color splitting prism assembly and where each of the color components exits said color splitting prism assembly, and further wherein the first, second and third prisms are dissimilar prisms, with first, second and third optical paths, a first optical path without reflections, a second optical path with one reflection, said one reflection being off of a synthesizing surface, and a third optical path with two reflections, one of said two reflections being off of an exit surface, wherein an angle between a direction normal to said exit surface and said synthesizing surface is in a range from about 40° to 50°.

27. A projection display in accordance with claim 26, wherein an angle between (a) said first optical path, and (b) a portion of said second optical path incident upon said synthesizing surface, is in a range from about 80° to 100°.

* * * * *